Nov. 30, 1971  A. BOON  3,623,855
METHOD OF SECURING A METAL SUPPORTING MEMBER TO
A GLASS WALL BY MEANS OF GLAZE
Filed April 3, 1969

INVENTOR.
ALBERT BOON
BY
AGENT

United States Patent Office 3,623,855
Patented Nov. 30, 1971

3,623,855
METHOD OF SECURING A METAL SUPPORTING MEMBER TO A GLASS WALL BY MEANS OF GLAZE
Albert Boon, Emmasingel, Eindhoven, Netherlands, assignor to U.S. Philips Corporation, New York, N.Y.
Filed Apr. 3, 1969, Ser. No. 813,231
Claims priority, application Netherlands, Apr. 10, 1968, 6805156
Int. Cl. C03c 27/00, 29/00
U.S. Cl. 65—43                    5 Claims

ABSTRACT OF THE DISCLOSURE

A method of securing metal supporting members having cavities to inside glass surfaces of a cathode ray tube by grinding down the edges contiguous with the cavities at two opposite locations before filling the cavities with a suspension of a sealing glass. After drying, sintering and cooling the glass the members are placed in a jig for positioning each member so that the center lines for the two oppositely located sections that have been ground down extend along lines which are at right angles to the main strain lines in the glass where the member is to be located. The members are then pressed against the glass surfaces so that only the cavity edges that were not ground down contact the glass surfaces, and the entire assembly is then placed in an oven to liquefy the glass. The liquefied glass flows around the edges of the member and causes the members to adhere to the glass surfaces.

---

The invention relates to a method of securing a metal supporting member to a glass wall by means of a suspension of a crystallizing glaze, particularly a supporting member for a color-selection electrode of a colour television picture tube, on the inside of the upright edge of the picture screen.

U.S. Pat. 2,949,702 describes a method of sealing a supporting member which comprises a cavity into the glass to a certain depth by locally softening the glass of the upright edge of a picture screen. The cavity is filled with air, so that the supporting member, after having been pressed into the soft glass to a certain depth and the pressing tool is retired, is pressed back a little so that a better transition from the glass to the metal of the supporting member is obtained. Since the pressing tool has to press the supporting member into the glass to a certain depth, the stroke of the pressing tool must be accurately determined. Therefore this tool is complicated.

A simpler tool may be used when the supporting member can simply be pressed against the surface of the glass, and is then adhered to the glass, for example, by means of a glaze as is described in U.S. Pat. 2,928,967 where the supporting member itself is not secured directly to the glass wall, but it is welded to a metal plate, which is previously secured to the glass wall by means of a glaze. In order to restrict the heat liberated during welding and to distribute it evenly over the plate, the supporting member is welded to the plate by means of three spotwelds, so that a gap is present between the supporting member and the plate.

It has been found, however, that afterwards cracking may occur, for example, during degassing, when the tube is considerably heated. The crack extends in a direction at right angles to the main strain lines present in the glass which direction in this case is generally parallel to the edge of the window. The main strain line is to be understood to mean the resultant of all the strains present in the glass from whatever cause they have arisen.

The said drawback of the known method of securing a metal supporting member to a glass wall by means of a glaze, particularly a supporting member for a colour selection electrode of a colour television picture tube, on the inside of the upright edge of the picture screen can be avoided if, according to the invention, the supporting member comprises a cavity the edge of which on at least two oppositely located locations has a smaller height over some distance than the original edge had at that location, the cavity is then filled with a glaze suspension, the glaze suspension is dried, the supporting member with the cavity filled with the glaze is pressed against the cold glass wall in such manner that the parts of the original edge of the cavity still present engage the surface of the glass, the assembly is then placed in an oven and heated to such a temperature that the supporting member is adhered to the glass wall by the glaze. Dependent upon the composition of the glaze, crystallisation of the glaze may have occurred.

The supporting member is preferably placed against the glass wall in such manner that the centre line of two oppositely located parts having a smaller height than that of the original edge of the cavity filled with glaze, extends at right angles to the main strain lines in the glass at that location, i.e. generally parallel to the edge of the window.

A glaze is preferably used which has crystallizing properties as is described, for example, in U.S. Pat. 3,291,586. In order to adhere the glaze readily in the cavity, the dried suspension may be sintered in the cavity.

In order that the invention may be readily carried into effect, it will now be described in greater detail, by way of example, with reference to the accompanying drawing, in which:

FIG. 2 is an underneath view of a supporting member according to the invention, while

Figure 1:
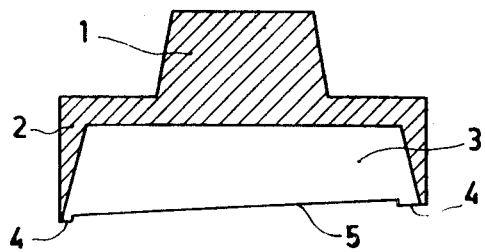
FIG. 1 is a cross-sectional view.
Figure 3:
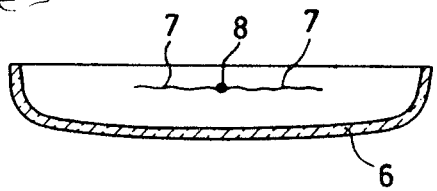
FIG. 3 is a cross-sectional view of a window portion provided with a known supporting member and FIG. 4 is a cross-sectional view of a part of a window portion provided with a supporting member according to the invention.
Figure 2:
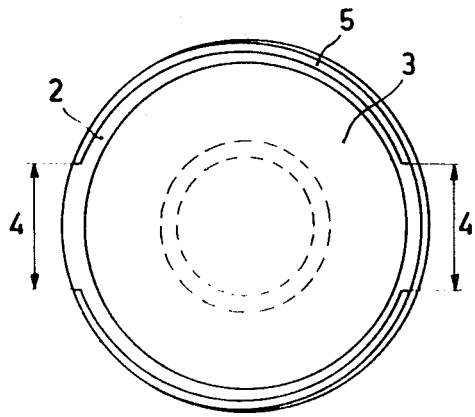

Referring now to FIG. 1, reference numeral 1 denotes a stud of a supporting member for a colour selection electrode, for example, a shadow mask of a color television picture tube. The stud 1 forms one assembly with a wide portion 2 which comprises a cavity 3. When such a member, in which the edge 4 of the cavity is circumferentially situated in one plane, is secured to the upright edge of a glass window 6 by means of a glaze, it is found that, usually afterwards, particularly upon degassing the picture tube during which it is heated to approximately 400° C., cracks 7 (FIG. 3) are formed in the glass. It is found that these cracks 7 occur at right angles to the main strain lines in the glass at that location, i.e. generally parallel to the edge of the screen.

If, however, the edge 4 is ground down a little on at least 2 oppositely located sides 5, so that the edge does not contact the glass of the window over the whole circumference afterwards, it is found that cracks no longer occur.

In the method according to the invention the number of supporting members required for supporting a color selection electrode, is placed in a jig. Since said jig presses the supporting members against the glass wall, no limiting of the pressure movement is necessary as in U.S. Pat. 2,949,702, so that a jig may be used of a simple construction, for example, as shown in U.S. Pat. 2,928,967. If desired, the color selection electrode itself may be used as a jig, in which case the tolerances in the length and in the place of attachment of the supporting members to said electrode, no longer play a part.

Figure 4:
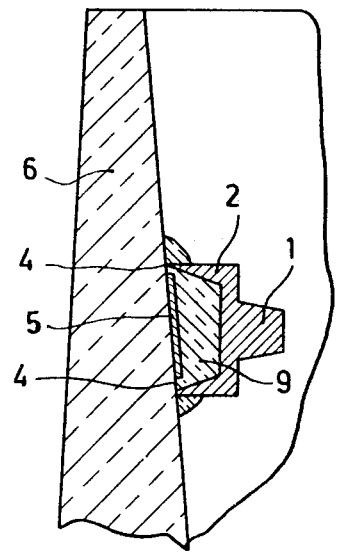

Prior to placing the supporting member in the jig, the cavity 3 of each member is preferably filled with a suspension of a crystallizing glaze of one of the compositions as described in U.S. Pat. 3,291,586, after which the glaze suspension is dried. In order to avoid crumbling away of the glaze when the supporting members are forced against the glass, the glaze may be sintered in the cavity by heating to approximately 350° C. After cooling the supporting members are pressed against the cold surface of the glass of the upright edge of the window portion by means of a jig. Only the parts 4 of the edge of the cavity of each supporting member contact the glass (FIG. 4). The assembly is then placed in an oven and heated in the conventional manner to 445° C. at which temperature the glaze liquefies and flows around the edge 4, 5 and adheres and crystallizes both to the metal of the supporting member and to the surface of the glass, so that, after cooling, the supporting members are rigidly secured to the inside of the upright edge of the picture screen. The jig may then be removed. The supporting members are preferably placed so that the centre line of the lowered edge portions 5 extend at right angles to the main strain lines in the glass, i.e. in general parallel to the edge of the picture screen. Besides on the shape of the glass article, the direction of the main strain lines also depends upon other factors, for example, the way of heating and cooling after the formation thereof.

The ground-down parts 5 may be approximately 100μ lower than the original edge would be at that location. It is sufficient that the portions 5 are just free from the glass surface.

Although one embodiment has been described, a supporting member according to the invention may alternatively be shaped differently. For example, more than four portions 4 and 5 may alternate over the circumference of the cavity, dependent upon the strain pattern in the glass article. The stud 1 may also be shaped differently, for example, as a triangle.

In a colour television picture tube in which the window portion and the cone are interconnected by means of a glaze, the same glaze is preferably used for securing the supporting members.

What is claimed is:

1. A method of securing a metal supporting member having a cavity to a glass surface comprising grinding edges of the metal member surrounding the cavity on at least two opposite locations thereby reducing the height of said member at portions of said edges, filling the cavity of said member with a suspension of sealing glass, drying said sealing glass, pressing said member against the cold glass surface so that remaining portions of the edges of the member are in direct contact with the glass surface, and heating said glass surface and member to liquefy said sealing glass so that said sealing glass flows around the edges of said member thereby causing said member to adhere to said glass surface.

2. A method as claimed in claim 1 wherein said suspension of sealing glass is a crystallizing sealing glass.

3. A method as claimed in claim 1 further comprising sintering said sealing glass in the cavity after said sealing glass suspension has dried.

4. A method as claimed in claim 1 wherein pressing said member comprises placing said member against the glass surface in such a manner that a center line of two oppositely located edges having heights lower than those of the original edges of the cavity filled with sealing glass extends along line at right angles to the main strain lines in the glass surface.

5. A method as claimed in claim 1 wherein said means for pressing said member against the glass surface comprises a jig comprising a color selection electrode of a color television tube.

References Cited

UNITED STATES PATENTS

| Re. 25,791 | 6/1965 | Claypoole | 65—33 X |
|---|---|---|---|
| 907,489 | 12/1908 | Genese | 65—154 |
| 1,579,626 | 4/1926 | Banta | 65—42 |
| 2,073,254 | 3/1937 | Redman | 65—49 |
| 2,089,791 | 8/1937 | Hammel | 65—49 |
| 2,486,085 | 10/1949 | Whitmore et al. | 65—59 X |
| 2,878,623 | 3/1959 | Vincent | 65—59 X |
| 2,949,702 | 8/1960 | Blanding et al. | 65—59 X |
| 3,004,182 | 10/1961 | Pfaender | 65—59 X |
| 3,341,443 | 9/1967 | Leonard | 65—36 X |
| 3,417,274 | 12/1968 | Bennett et al. | 65—59 X |

FRANK W. MIGA, Primary Examiner

U.S. Cl. X.R.

65—49, 59, 154